Fig. 4.

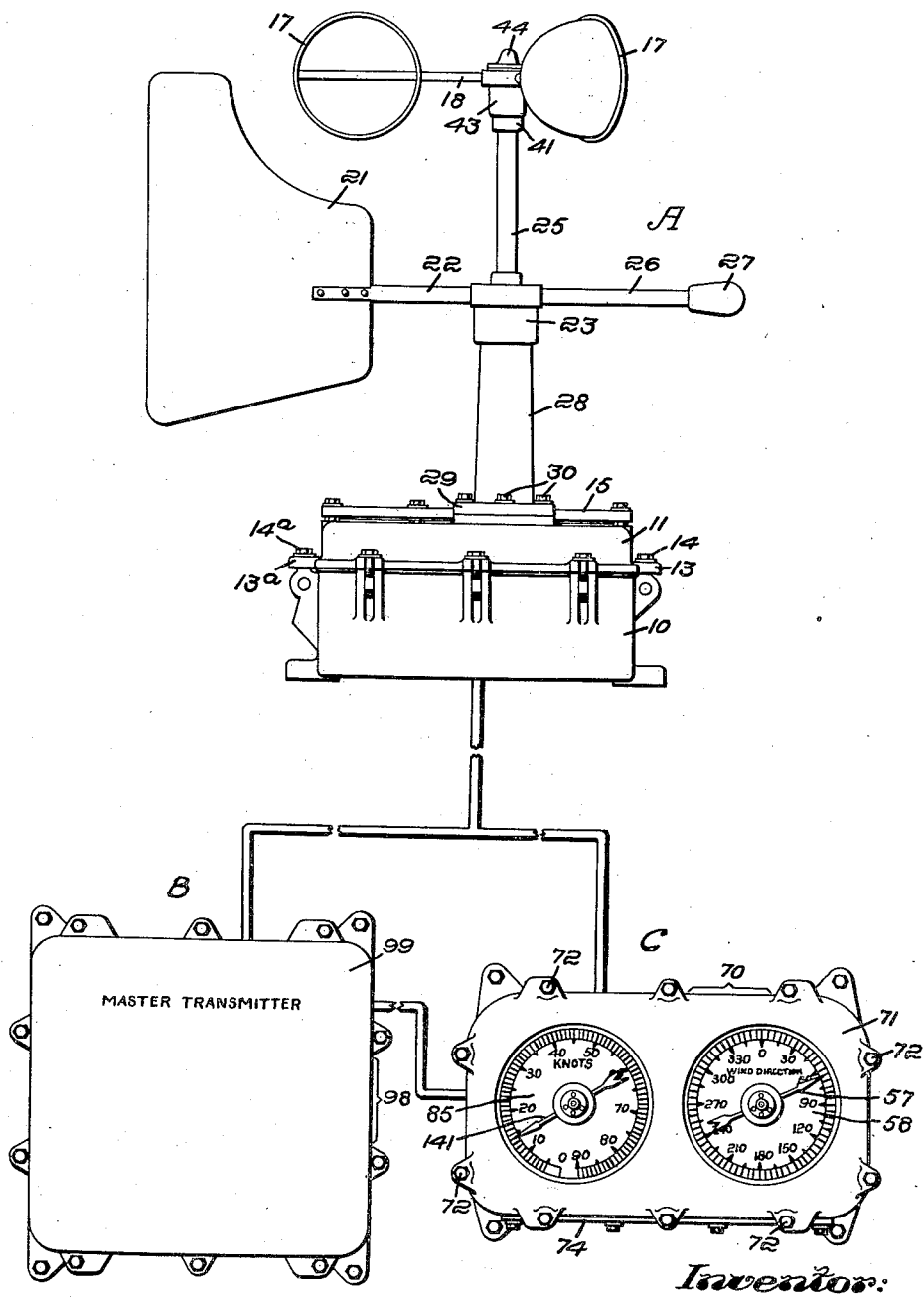

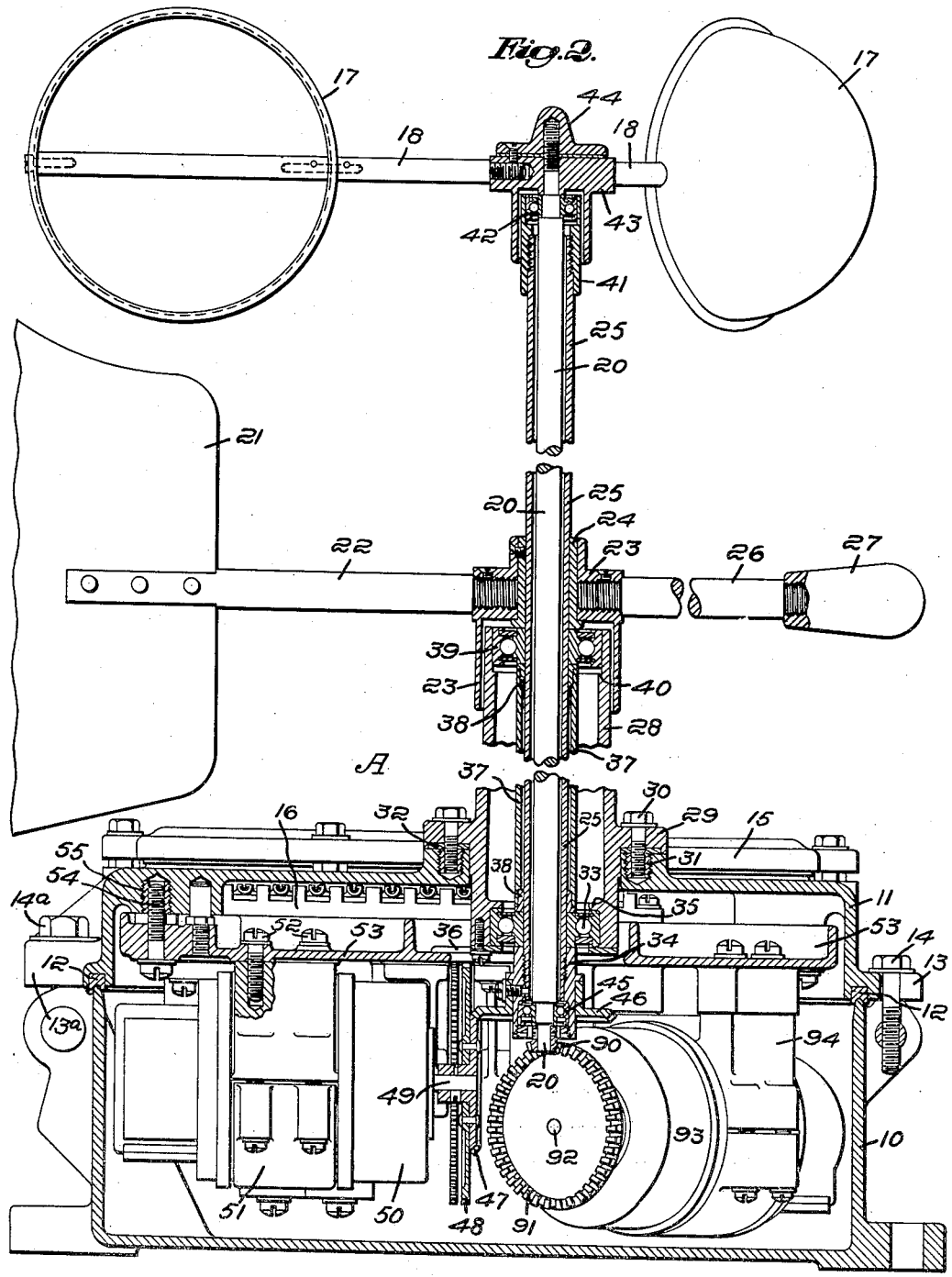

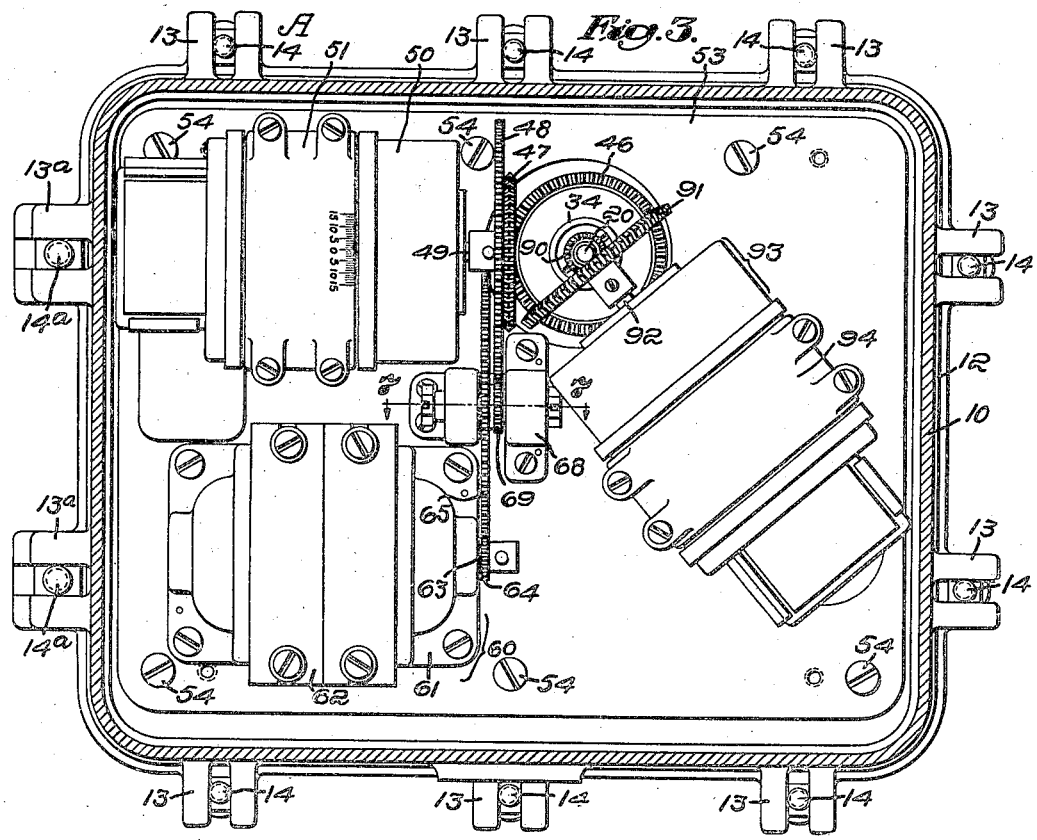
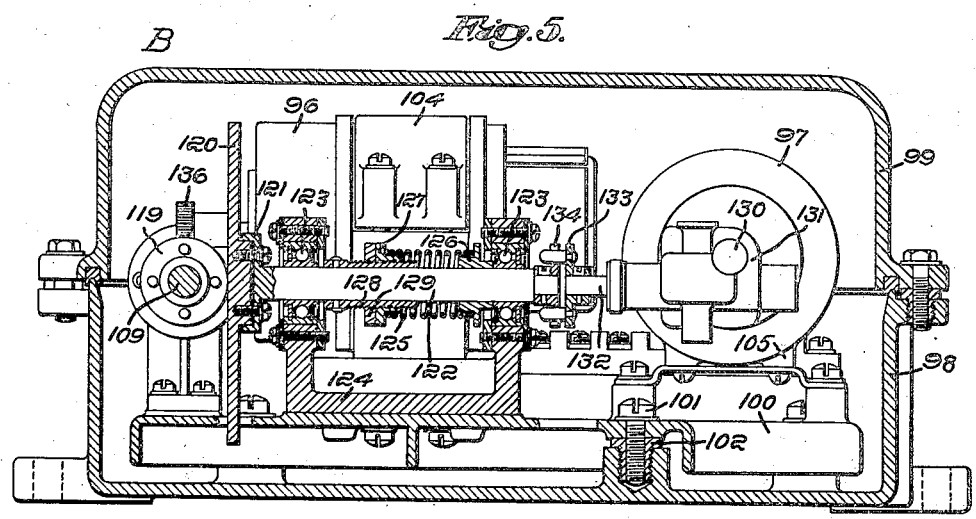

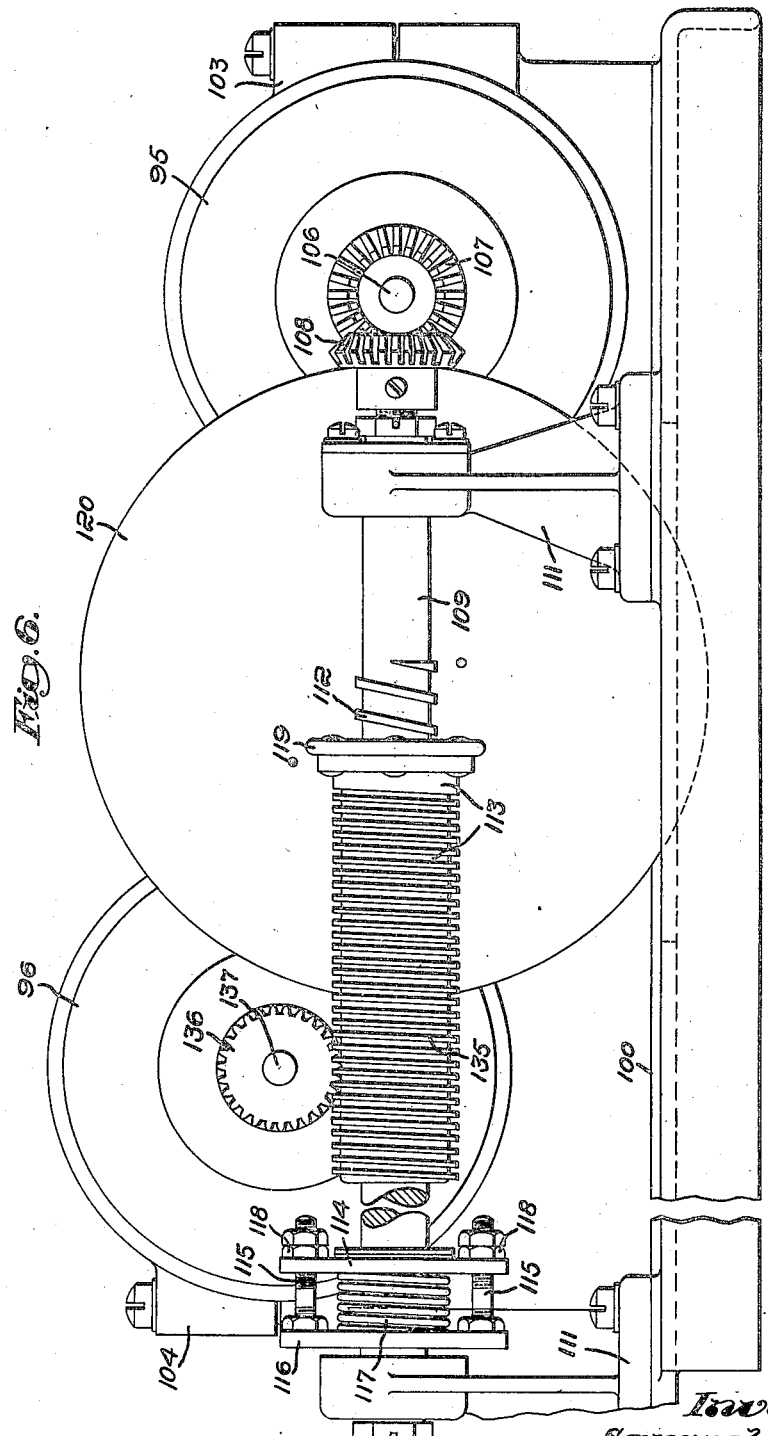

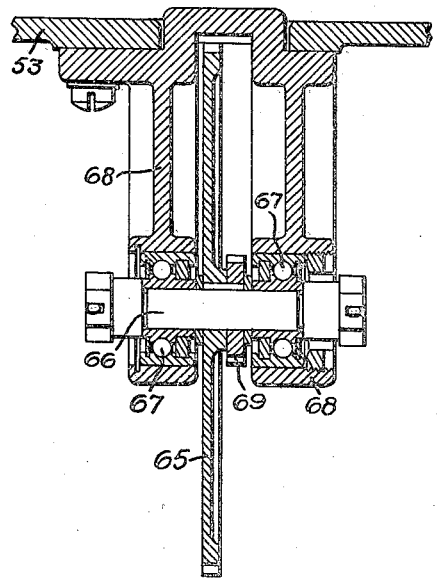
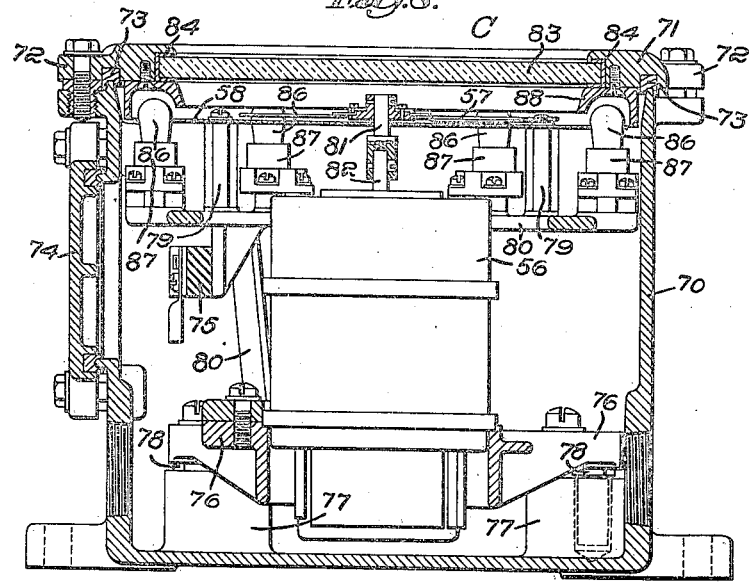

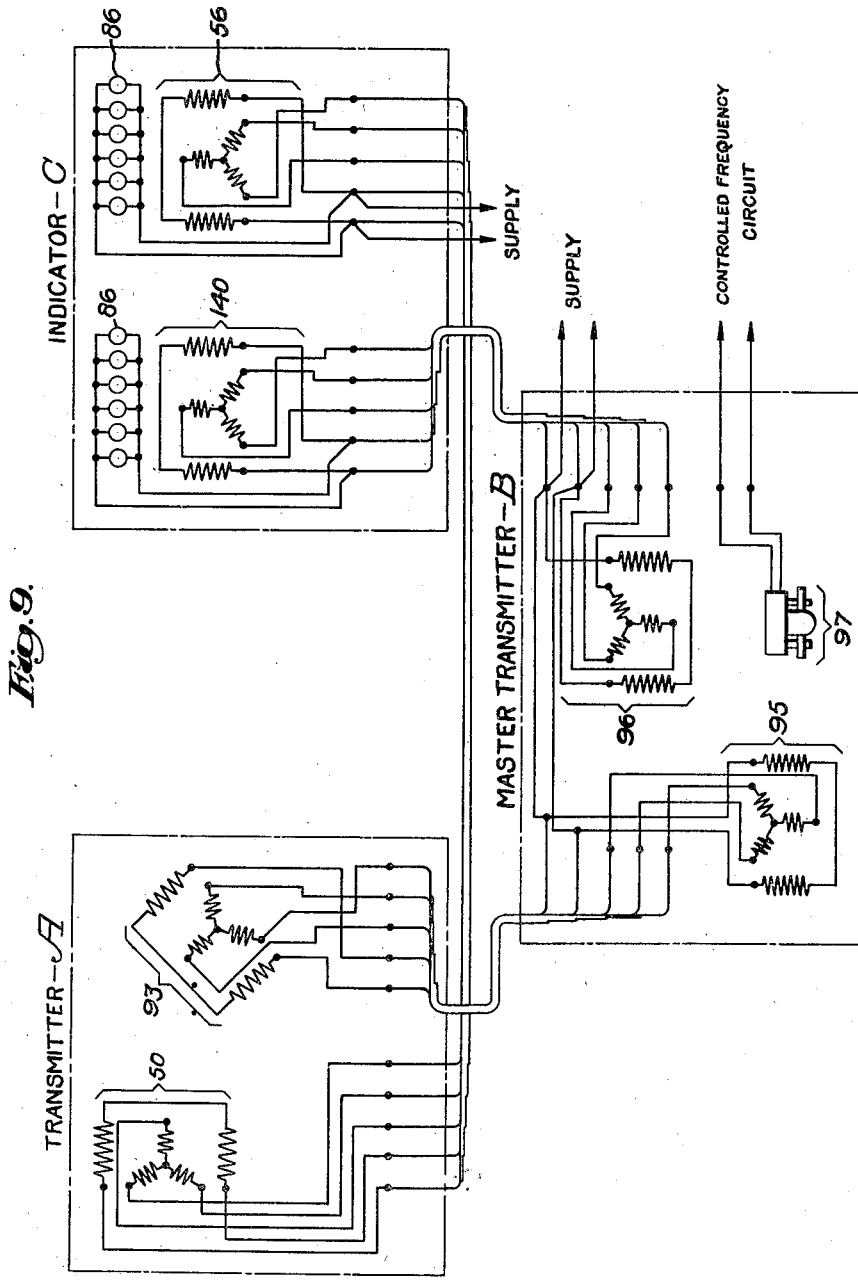

Patented Jan. 3, 1939

2,142,951

UNITED STATES PATENT OFFICE 2,142,951

MEASURING AND INDICATING, PARTICULARLY APPLICABLE TO WIND DIRECTION AND VELOCITY

Samuel N. Mead, Amesbury, Mass., assignor to Henschel Corporation, Amesbury, Mass., a corporation of New York Application March 17, 1936, Serial No. 69,309

3 Claims. (Cl. 264—9)

The present invention relates to the detecting and measuring of mechanical movements and their indication at a distance, and aims to provide an improved method and compact, accurate, serviceable and otherwise improved apparatus for this purpose, having particular reference to the measurement and distant indication of wind velocity and wind direction as for example upon shipboard.

In the drawings illustrating by way of example one embodiment of the invention and showing means suitable for the practice of the method thereof, Fig. 1 is an elevational view of the three main units comprised in a wind direction and velocity system in accordance with the invention;

Fig. 2 is a vertical section upon a larger scale of the detecting and transmitting unit;

Fig. 3 is a horizontal section through the case of Fig. 2, looking from below, or as viewed looking onto the inner face of the cover when open;

Fig. 4 is a horizontal section showing the mechanism of the intermediate or master transmitter unit;

Fig. 5 is a section on the line 5—5 of Fig. 4 looking in the direction of the arrows;

Fig. 6 is an enlarged elevational view of a portion of the master transmitter unit of Figs. 4 and 5;

Fig. 7 is a section on the line 7—7 of Fig. 3;

Fig. 8 is a vertical transverse section through the indicator casing, showing one of the indicator assemblies; and Fig. 9 is a wiring diagram.

As previously stated the invention in various of its aspects is susceptible of wide use in the measurement and distant indication of the rate and extent of movement of rotary and other moving parts, such as shafting and other driving or driven elements. It is, however, peculiarly adapted for use in determining and distantly indicating or recording information as to the direction and velocity of the wind. The system herein illustrated and described by way of example has been developed primarily for use on board ship, and particularly on naval vessels. Accordingly it is of rugged and weather-proof construction throughout, as will be apparent from the accompanying drawings.

In general, and referring first to Fig. 1, the system includes three distinct units as there shown. These are respectively a transmitter or detector unit A embodying a combined anemometer and wind vane, a master transmitter B associated with the velocity indicating system, and the distant indicator unit C affording readings of wind velocity expressed in knots and of wind direction in degrees relative to the bow of the ship. The detector and transmitter unit A is arranged to be mounted at an appropriate exposed point as upon the trident truck or yard arm. The master transmitter B may be located at any convenient point either above or below deck, and the indicator unit C, of which any desired number may be employed in connection with a single unit A and single unit B, is stationed at any point where the information is desired, as upon the bridge, in the control room, or elsewhere.

MECHANICAL ELEMENTS OF THE TRANSMITTING HEAD

As seen in Fig. 1, and in detail in Figs. 2 and 3, the detecting and transmitting unit or head A comprises a water-tight case 10 including a cover 11 having a peripheral gasket 12 for sealing engagement with the lower portion of the case, upon which it is removably held as by the series of slotted lugs 13 and cooperating hinged screw bolts 14. The lugs 13ª and bolts 14ª at one side of the case, seen at the left in Fig. 2, are arranged to serve as separable hinge connections about which the cover and the parts carried by it can be swung up into open position. A section of the cover is formed with an opening which is normally closed by a gasketed plate 15 which may be removed for access to the electrical connections at the terminal bar 16 within the case.

The transmitting head A presents in combination a wind velocity gage and a wind direction detector. The former is of the anemometer type, including a set of anemometer cups 17 mounted on rods 18 fixed at the upper end of the freely rotatable anemometer shaft 20, so that the cups and shaft are free to revolve before the wind, at a speed in direct proportion to the wind velocity. The cups and their supporting rods may be of any suitable, preferably strong and light metal or other material, for example, aluminum or an alloy thereof. The wind direction instrument comprises a wind vane 21 on an arm 22 secured in a cap 23 fast on a concentric sleeve 24 which is fixed on the hollow wind-direction shaft 25. The vane is counter-weighted by a diametrically aligned arm 26 carrying a weight 27.

The two main rotary parts referred to, namely, the wind velocity or anemometer shaft 20 and the surrounding wind direction shaft 25, are supported on the cover of the case 10 by means of a removably mounted tubular housing 28. A flange 29 at the lower portion of the housing receives screw bolts 30 which take into inserts 31 tapped into an annular boss on the cover 11. A gasket 32 desirably is interposed between this flange and its supporting boss, similar gasketing or other sealing means being provided between all fixed but separable exposed parts.

The wind direction shaft 25 extends downwardly through the stationary housing 28 into the case where it is supported by a ball-bearing unit 33 held between a short sleeve 34 threaded on said shaft and an internal annular rib 35 on the housing. Additional support for the bearing is provided by a retaining plate 36 screwed to the bottom of the housing. Above this ball-bearing is an elongated sleeve 37 surrounding the hollow wind direction shaft 25 and attached to it by upper and lower collars 38. Another similar ball-bearing unit 39 is supported upon said sleeve 37 and upon an internal shoulder 40 on the housing. The sleeve 24 of the cap 23 to which the wind vane is attached, as previously mentioned, rests on the inner, rotary ring of this upper bearing unit 39.

At the upper end of the wind direction shaft 25 there is threaded a short sleeve 41 providing a seat for the upper ball-bearing unit 42 for the anemometer shaft 20. The inner ends of the supporting rods 18 for the anemometer cups are fixed in a cap 43 fast on the upper end of the anemometer shaft, the latter being threaded for the reception of a gasketed cap nut 44. The anemometer shaft 20 extends downwardly through the housing 28 and through the wind direction shaft 25 and is provided with additional bearing support at its lower end, by means of a ball-bearing unit 45 set in a recess in the short sleeve 34 at the bottom of the direction shaft 25.

WIND DIRECTION SYSTEM

The ball-bearing supported wind vane 21 described constitutes the prime mover of the wind direction detecting and indicating portion of the combined direction and velocity indicating system of the invention. It is mechanically and electrically connected with the direction indicator device in the following manner, in the illustrated example. The sleeve 34 at the lower end of the wind direction shaft 25 has fixed upon it a bevel gear 46 meshing with a similar gear 47 riveted flatwise against a spur gear 48 fast on the projecting end of the rooter shaft 49 of a motor 50 of the self-synchronous transmitting or generator type. This and similar motors are sometimes referred to herein as synchronizing motors, as distinguished from a constant-speed so-called synchronous motor wherein the reference is to synchronism with respect to a controlled frequency supply current. The supporting bracket 51 of this motor is mounted, as by means of screw bolts 52, at the under face of a supporting base plate 53 attached to the inner face of the cover 11, as by means of a series of screw bolts 54 taking into inserts 55 tapped into thickened portions of the cover. This self-synchronous transmitting motor 50 is electrically connected directly to a similar synchronous receiving or indicator motor 56 (Fig. 8) located in the casing of the indicator unit C, to be referred to in more detail later. The wiring connections between the two motors are such that as the rotor of the transmitting motor 50 turns in response to movement of the wind vane, the direction indicating motor 56 follows it accurately and hence, by means of an attached pointer 57, gives an instantaneous and correct indication of the wind direction upon the appropriate dial 58, see Fig. 1.

In order to prevent the wind vane from swinging erratically and moving more or less continuously under the effect of gusts I have herein provided dampening means associated with the vane and its supporting shaft. Said means is so arranged that any wind as to which directional information is desired, namely, any steady wind of a reasonable velocity, say five knots or greater, has an immediate turning effect on the vane, but the latter is not affected by sudden unimportant temporary gusts. I have illustrated for this purpose, as shown in Fig. 3, a magnetic dampener indicated as a whole by the numeral 60. It is mounted on a base 61 screwed to the main base plate 53, adjacent the direction transmitting motor 50. This device is in the nature of a magneto, having for its field a permanent magnet 62 and having the windings of its rotor short-circuited upon themselves. These windings may comprise, for example, six coils each composed of 150 turns of #26 wire B. and S. gauge.

The rotor shaft 63 of this magnetic dampener has fixed on its projecting end a pinion 64 meshing with a spur gear 65 keyed on a short countershaft 66, seen in detail in Fig. 7. This shaft is supported on ball bearings 67 set in a yoke-shaped bearing bracket 68 hung from the main supporting base plate 53. Keyed on said shaft is a pinion 69 which meshes with the previously-mentioned spur gear 48 on the rotor shaft of the transmitting motor 50. The effect of this gearing connection between the transmitter rotor and that of the dampener is to brake the former against sudden impulsive movements of more or less violence but still allowing it to move freely in response to any steady turning of the wind vane under the influence of a shifting wind. It will be noted that the dampener rotor is geared up substantially, so that the short irregular vane movements, which it is desired to counteract, produce an adequate dampening effect.

*Direction indicator*

As will be apparent from the wiring diagram, Fig. 9, the direction transmitting motor 50 communicates directly with the direction indicating device of the indicator unit C, Figs. 1 and 8. This indicator unit C as a whole comprises a water-tight case 70 having a removable cover plate 71 secured in position as by the lug and screw connections 72, a sealing gasket 73 being provided between the main portion of the case and its cover. One wall of the case is equipped with a removable gasketed plate 74 for access to the terminal bar 75. The case 70 in this instance serves to house the indicator devices both for the wind direction and the wind velocity systems, which devices may be substantially identical except for the indicator dials themselves. Fig. 8 accordingly may be considered as a typical section through either of the indicators, although it will be described with reference to the wind direction system.

Referring to said Fig. 8, the motor 56 is of the self-synchronous type, generally similar to the motor 50 of the transmitter unit. For convenience in reference any motors herein which serve to pass along an indication, such as those of unit A, are termed transmitting motors, and the motors, such as those of unit C, which act in response to and in conformity with the transmitting motors, are termed receiving or indicator motors. As illustrated, they are of similar construction, both mechanically and electrically, except that the indicator motors preferably include a mechanical mechanism for dampening oscillations.

By way of brief explanation of the operation of these transmitting and indicating motors it may be noted that each is generally similar to a three-phase alternator having a stationary two-pole field whose winding is connected to a single-phase alternating current source. The stators or fields of a transmitter motor and of all indicator motors which are operated in unison with the particular transmitter are connected to the same supply circuit, and their three-phase rotors are connected together electrically, as apparent in the wiring diagram, Fig. 9. When so connected and with the supply circuit closed an alternating voltage is impressed upon the interconnected stators. As the indicator rotor is free to turn, it will take up a position corresponding to the transmitter rotor, following the latter at the same speed and in the same direction.

This synchronous operation of the motors is due to the fact that the single-phase current in the stator, or primary circuit, induces voltages which are unequal and vary with the positions of the rotor in the rotor or secondary circuit. When the indicator rotor is in exact correspondence with the transmitter rotor the voltages induced in the three phases of the indicator rotor equal those induced in the three phases of the transmitter rotor; that is, the voltage in phase number one of the indicator is equal to the voltage in phase number one of the transmitter, and similarly as to the number two and number three phases. As these induced voltages are equal and balanced no current will flow in these circuits.

If the indicator rotor is restrained from assuming the same position as the transmitter rotor the induced voltages in the three phases of the indicator rotor will no longer be equal to and balance the induced voltages in the corresponding phases of the transmitter rotor. Due to this unequal condition, current will flow in these circuits, thereby setting up a torque between the rotor and stator tending to restore the balanced condition, and reacting against any force which restrains the indicator, thereby trying to bring it into agreement with the transmitter rotor.

Referring again to Fig. 8, the indicating motor 56 is mounted on a spider 76 screwed to bosses 77 formed on the case, cushioning spacers 78 desirably being provided between the spider and lugs. The dial 58 is supported by posts 79 rising from a bracket 80 attached to the casing. The rotating pointer 57 is mounted on an extension 81 of the rotor shaft 82 of the motor. The dial is viewed through a window 83 in the cover plate 71 and sealed with respect to it as by the peripheral gasket 84. This dial, as well as the wind velocity dial 85 to be referred to (Fig. 1), preferably has a black background, with the graduations and markings treated with radium luminous material. The cooperating pointers, such as the member 57, desirably are white tipped with radium luminous material, so that the instruction is easily read in the dark, the dials being of good size, desirably at least five or six inches in diameter, for easy reading at a distance.

Illumination may be provided for the dial faces, and for this purpose I have illustrated a circumferential series of lamps 86, preferably of the argon filled VG-2A type, distributed equally about the dial in sockets 87 on the bracket 80. An annular reflector and shield 88 is placed above the lamps to shield them from the observer's eyes and to confine and distribute the illumination over the face of the dial. The reflector ring 88 as illustrated is removably screwed to the cover plate 71 and serves also to retain the window 83.

As seen in Fig. 1, the wind direction indicator dial 58 is graduated into degrees at five-degree intervals, from a zero point corresponding to the ship's bow. Thirty-degree intervals may be numbered with relatively large figures, with intermediate degrees designated in smaller numbering, substantially as illustrated.

WIND VELOCITY SYSTEM

Figure 4:
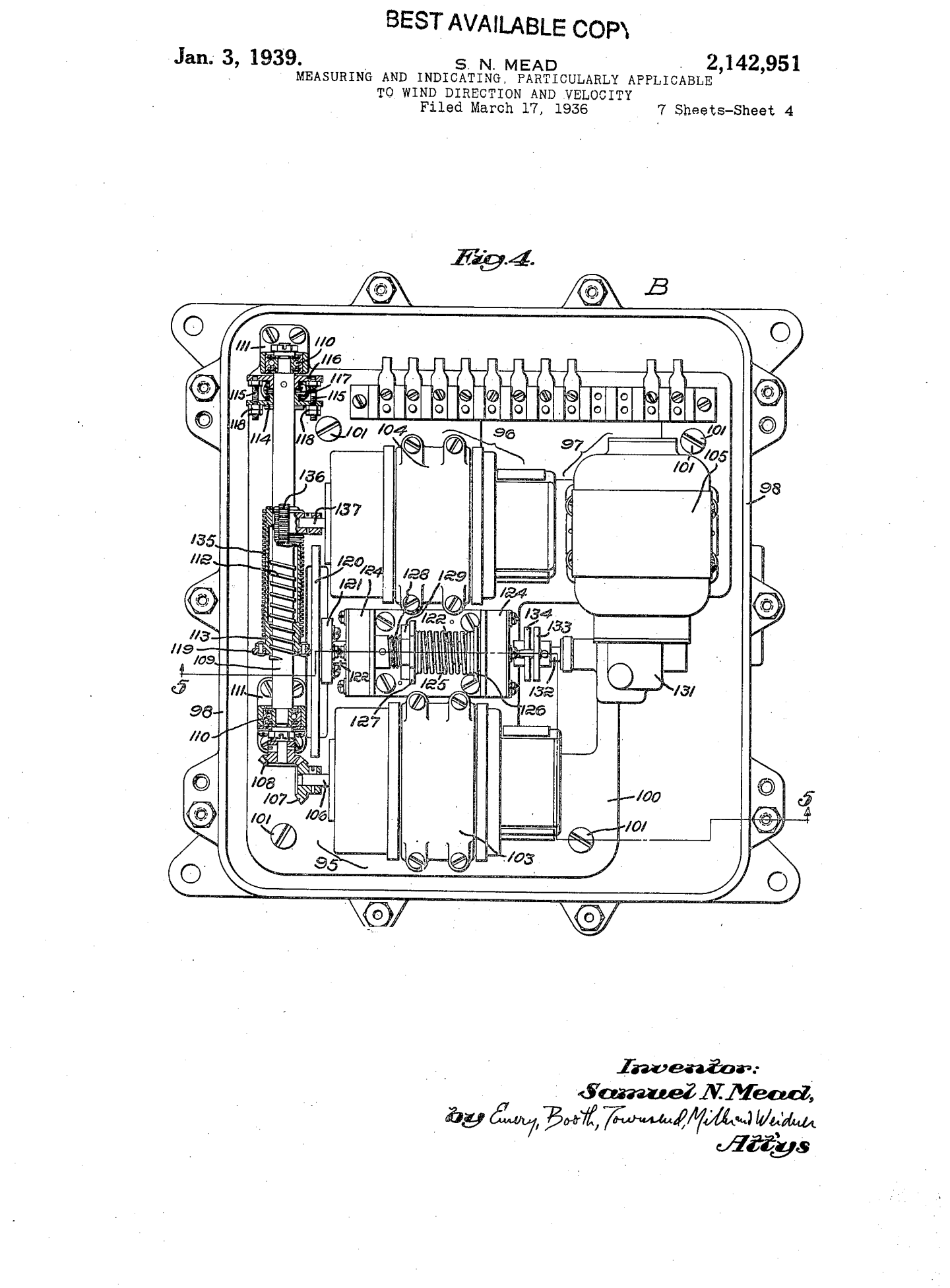

The wind velocity apparatus of the combined velocity and direction system comprises the transmitting anemometer of unit A, Figs. 1 and 2, the main mechanical parts of which have already been described, a master transmitter, namely, the unit B of Fig. 1, seen also in Figs. 4, 5 and 6, and one or more indicators, one of which is shown in Fig. 1 in association with the casing of the combined velocity and direction indicator C.

Referring now to Figs. 2 and 3, the wind velocity or anemometer shaft 20 has fixed at its lower end within the transmitter case a pinion 90 meshing with a bevel gear 91 fixed on the projecting end of the rotor shaft 92 of a transmitting motor 93 of the self-synchronous type previously described. This motor is mounted by means of a bracket 94 hung from the main base plate 53 on the cover of the transmitter case 10. The gear ratio as illustrated between the pinion 90 and gear 91 is five to one, so that the rotor of the transmitting motor 93 receives one revolution for five revolutions of the anemometer shaft 20.

This transmitting motor 93 is electrically connected to a similar receiving motor 95 comprised in the master transmitter unit B.

Master transmitter

This intermediate or master transmitter instrument, unit B of Fig. 1, is an element of the wind velocity portion of the system as contrasted with the wind direction portion thereof already described. Its main operating elements comprise, in addition to the receiving motor 95, a second transmitting motor 96 for sending on a resultant indication to the velocity indicator itself, a constant-speed synchronous motor 97, and a coordinating mechanism including a friction disc and follower and other parts now to be described.

This master transmitter B comprises a case 98 including a gasketed cover 99 removably held in sealing position similarly as those of the other units. The operating parts of the master transmitter are mounted on a base plate 100 cushioned and secured to the bottom of the case as by the screw bolts 101 and spacers 102, Fig. 5. The intermediate or receiving motor 95 and the second transmitting motor 96 are secured to the base plate by their motor brackets 103 and 104 respectively and the constant-speed motor 97 is similarly held in its bracket 105.

These three motors are mechanically associated and interrelated so that the angular movement, directly proportionate to the wind velocity and which is impressed upon the rotor of the velocity transmitting motor 93 of unit A and transmitted by it to the intermediate receiving motor 95 of unit B, is converted into a resultant motion which is accurately expressive of and directly proportionate to any speed change in the angular movement representative of the wind velocity. This resultant motion, indicative of change in wind velocity, is of a character suitable for operating the velocity indicator device of unit C and is transmitted to the latter by the transmitting motor 96 of unit B.

For the described purpose the rotor shaft 106 of the motor 95 has fixed on it a mitre gear 107 meshing with a similar gear 108 fast on the adjacent end of a rotary shaft 109, these gears having a one-to-one ratio. This shaft 109 is supported at its opposite ends in ball-bearing units 110 on bearing brackets 111 secured to the base plate 100. Formed on this shaft 109, which is preferably of steel, is a spiral thread 112 receiving a similarly internally threaded nut 113, desirably of bronze.

The shaft 109 and nut 113 are so related that when they revolve together at the same rate there is no travel of the nut relative to the shaft, but when the shaft turns at a rate different from that of the nut the latter is threaded along the shaft in one or the opposite direction accordingly as the speed of the shaft is greater or less than that of the nut. The mechanism here referred to is best seen in the larger scale Fig. 6. As viewed in said figure, increasing speed of the shaft 109 in response to a rising wind velocity causes the nut 113 to thread toward the left, the opposite action taking place in the event of a fall in wind velocity.

An over-speed device at the left or high velocity end of the shaft 109, Fig. 6, avoids jambing of the mechanism in such rare instances when the wind velocity exceeds the maximum indicating limit of the instrument, which in the case illustrated is ninety knots. This over-speed or safety device, see Fig. 6, comprises a collar 114 surrounding the threaded shaft 109 and slidable lengthwise thereof on studs 115 supported by a second collar 116 fixed against the adjacent bearing bracket 111. A coil spring 117 between the two collars urges the slidable collar toward the nut, that is, to the right in Fig. 6, the tension of the spring being adjustable as by means of the nuts 118 on the studs. The two collars are sufficiently spaced so that under extreme wind velocities the bronze nut 113 may engage and move the slidable collar to the left, compressing the spring, sufficiently to allow the nut to ride off from the spiral thread 112. Upon subsequent dropping of the wind velocity the coil spring reengages the nut with the spiral.

The inner or right hand end of the nut 113, Fig. 6, has riveted or otherwise secured to it a hardened roller or idler 119. This idler makes peripheral contact with the flat face of friction disc 120 preferably formed of hardened steel, polished and ground.

As best seen in Fig. 5, the friction disc 120 is secured to an enlargement 121 at the adjacent end of an actuating shaft 122 rotatably mounted in ball bearings 123 on a U-shaped bracket 124 rising from the base plate 100. Adequate pressure is maintained between the friction disc 120 and idler 119 to avoid slippage, as by means of a coil spring 125 surrounding the shaft 122. One end of the spring abuts collar 126 loose on the shaft and received against the adjacent bearing 123, and the other end of the spring bears against an adjustable nut 127 threaded on a sleeve 128 pinned on the shaft. A lock nut 129 desirably is provided for the adjustable nut, turning of which latter serves to adjust the tension upon the spring and hence the pressure between the idler and the disc.

The shaft 122 and the disc carried by it are driven at a constant speed by the synchronous motor 97 previously referred to, which is operated on a controlled-frequency circuit, such as the clock circuit generally available at the point of use. The shaft 130 of this constant-speed motor 97 is directly connected within the gear housing 131 to a short drive shaft 132 which latter in turn is coupled to the disc shaft 122, as by means of the male and female coupling elements 133 and 134 respectively.

From the foregoing it will be apparent that since the disc and idler are in non-slip rolling contact, the lineal speed of the rim of the idler is always the same as that of the disc at the point of contact. Thus the idler receives a certain angular velocity depending on its position radially of the disc. By reason of the spiral threaded connection between the idler-carrying nut 113 and the shaft 109, the idler always seeks a position along the shaft and radially of the disc at which its angular velocity will be uniform with that of the threaded shaft. When the latter is at rest, as under a condition of no wind, the idler assumes a central position upon the disc where it also remains at rest. When the angular velocity of the threaded shaft 109 varies with respect to that of the idler, under changes in the wind velocity, the nut and idler will move along the shaft and radially of the disc until the idler finds that point upon the disc where the angular velocity of the idler conforms to that of the shaft. Since the disc is driven at a constant speed there is a definite position of the nut and idler corresponding to any given velocity of the shaft, and hence to any wind velocity. In other words, the position of the nut and idler affords a positive indication of the wind velocity at any time while the instruments are in operation.

In accordance with the invention this wind velocity indication may be transmitted to any desired point upon the ship or other place of use of the apparatus, or to any desired number of stations, one of which is herein represented by the velocity indicator device of the unit C.

To accomplish this, in the illustrated example, the nut 113 is externally threaded as indicated at 135, Figs. 4 and 6, to provide a circular rack-like formation, which is in driving engagement with a pinion 136 fast on the adjacent projecting end of the rotor shaft 137 of the transmitting motor 96.

*Velocity indicator*

The velocity-indication transmitting motor 96 of the master transmitter unit B is electrically connected to the receiving or indicating motor 140 (see Fig. 9) of the velocity indicator of unit C, in a similar manner as previously described in connection with the other self-synchronous motors, as in the wind-direction portion of the system. The velocity indicator motor and associated parts need not be illustrated in detail inasmuch as they may be a substantial duplication of the construction illustrated in Fig. 8 and described in connection with the wind direction portion of the system.

Referring to Fig. 1, the rotor shaft of the velocity-indicating motor has attached to it a pointer 141 movable over the wind velocity dial 85 already referred to. This dial as illustrated is graduated to read directly in terms of wind velocity as expressed in knots, through a range from zero to ninety. The graduations are appropriately numbered at convenient intervals, as illustrated for example by the larger index marks opposite the tens of knots and the smaller index marks for the intermediate five-knot graduations. In actual practice velocities below five knots may be disregarded. The velocity dial 85 is calibrated to compensate for any variation in the ratio of wind travel to travel of the anemometer cups, which ratio generally is somewhat less at the higher wind velocities.

The wiring diagram, on which the main electrical units are designated by the same numerals as in the other figures, will readily be understood from the foregoing description and the references to the diagram already made therein.

While I have herein used the term "dial" in connection with the indicators and have illustrated rotary pointers, it will be understood that the scales or dials need not be circular or arcuate and that the pointer movement may be other than rotary. Similarly, the primary movement which it is desired to indicate at a distance may be other than rotary, being converted into a corresponding or proportionate angular movement for the purposes of the transmitting and indicating system. It will also be particularly noted that through the medium of the novel master transmitter mechanism the system of the invention is made capable of transmitting to a distance accurate indications of changes in velocity of the primary movement, over a wide range, as well as changes in position of a primary part, herein the wind vane, as contrasted with the velocity of its movement. In its particular use herein illustrated and described by way of example the system affords an accurate and continuous indication of the direction and velocity of the wind and that indication may be made available at any desired distant station but the system is not confined to such use and is useful in other connections, either on shipboard or elsewhere, such for example as distantly indicating the rotation of a ship's propeller shaft. The response of the indices or pointers of the indicating devices is substantially instantaneous and their movement is steady and smooth, without disconcerting fluttering or jerking. Among other advantages, the system is noiseless in operation.

As is readily apparent from the illustrations the apparatus is of waterproof and weather-resistant construction throughout, and is strongly built for efficient service under rigorous conditions such as met on shipboard, even to the extent of withstanding the shocks of gun fire.

It will be understood that my invention, either as to means or as to method, is not limited to the exemplary embodiment or steps herein illustrated or described, its scope being set forth in the following claims.

I claim:

1. A transmitting unit for a remote-indicating system for velocities, particularly wind velocities remotely detected, comprising, in combination, a shaft driven at a speed always in the same proportion to that of the initial variable movement of the remote element to be indicated, anti-friction bearings supporting said shaft, a spiral thread on the shaft, a tubular nut having an internal spiral formation engageable with said thread on the shaft, a friction wheel concentric with and angularly fixed relative to the nut, a friction disc having its face in driving contact with the periphery of said wheel while permitting the latter to shift radially of the disc, a constant-speed electric motor for continuously driving the friction disc whereby under changes in the angular velocity of the shaft the nut is caused to travel on the shaft in one or the opposite direction accordingly as the speed of the shaft is accelerated or decelerated and the nut and wheel are caused to seek and assume a position radially of the disc and axially of the shaft within the shaft, nut and wheel again have a uniform angular velocity, an indication transmitting shaft adapted for direct coupling to the rotor shaft of a transmitting motor, a pinion fixed thereon, and an external circular rack-like formation directly on the nut and operatively engaging said pinion thereby to turn said transmitting shaft to extents and in a direction corresponding to the axial travel of the nut on and relatively to the variably driven shaft, as indicative of the remotely instituted speed variations of the latter.

2. In a velocity remote-indicating system, an integrating and transmitting unit including, in combination, a shaft variably driven responsively to the speed variations of a controlling remote element, a spiral thread on the shaft, a tubular nut having an internal spiral formation normally engaging the thread on the shaft, a friction wheel connected to the nut, and a constant-speed friction disc in facial contact with the periphery of the wheel whereby for any given speed of the remotely controlled driven element from zero to maximum said wheel and nut have a corresponding position along the shaft and radially of the friction disc, said shaft having a non-threaded portion beyond one end of the spiral thread, of a length to receive the nut and to permit the latter to move out of engagement with the spiral thread in the event of overspeeds of the remotely controlled driven shaft, and means to effect re-engagement of the nut and thread upon subsequent drop in the speed of said shaft.

3. In a velocity remote-indicating system, an integrating and transmitting unit including, in combination, a shaft variably driven responsively to the speed variations of a controlling remote element, a spiral thread on the shaft, a tubular nut having an internal spiral formation normally engaging the thread on the shaft, a friction wheel connected to the nut, and a constant-speed friction disc in facial contact with the periphery of the wheel whereby for any given speed of the remotely controlled driven element from zero to maximum said wheel and nut have a corresponding position along the shaft and radially of the friction disc, a supporting shaft for said friction disc, anti-friction bearings for said supporting shaft, the latter having opposite end portions extending beyond said bearings and the friction disc being demountably fixed on one of said end portions, an abutment collar loose on said supporting shaft and held against axial movement away from the friction disc, a screw-threaded formation on said supporting shaft between the friction disc and said collar, an abutment member adjustably received on said screw-threaded formation, a coil spring surrounding said supporting shaft and bearing between said collar and abutment member under compression controllable by adjustment of said abutment member, a constant-speed electric motor, and coupling elements at the extended end of the supporting shaft opposite its disc-carrying end and readily detachably connecting it with the motor shaft.

SAMUEL N. MEAD.

CERTIFICATE OF CORRECTION.

Patent No. 2,142,951.  January 3, 1939.

SAMUEL N. MEAD.

It is hereby certified that error appears in the printed specification of the above numbered patent requiring correction as follows: Page 5, second column, line 6, claim 1, for the word "within" read wherein; and that the said Letters Patent should be read with this correction therein that the same may conform to the record of the case in the Patent Office.

Signed and sealed this 14th day of February, A.D. 1939.

Henry Van Arsdale.

(Seal) Acting Commissioner of Patents.